(12) United States Patent
Clemen

(10) Patent No.: US 8,444,378 B2
(45) Date of Patent: May 21, 2013

(54) BYPASS DUCT OF A TURBOFAN ENGINE

(75) Inventor: Carsten Clemen, Mittenwalde (DE)

(73) Assignee: Rolls-Royce Deutschland Ltd & Co KG (DE)

(*) Notice: Subject to any disclaimer, the term of this patent is extended or adjusted under 35 U.S.C. 154(b) by 742 days.

(21) Appl. No.: 12/721,117

(22) Filed: Mar. 10, 2010

(65) Prior Publication Data

US 2010/0232954 A1 Sep. 16, 2010

(30) Foreign Application Priority Data

Mar. 10, 2009 (DE) .................... 10 2009 011 924

(51) Int. Cl.
*F01D 25/24* (2006.01)
(52) U.S. Cl.
USPC ......... 415/144; 415/191; 415/211.2; 415/220
(58) Field of Classification Search
USPC ............... 415/191, 211.2, 220, 221, 144, 914
See application file for complete search history.

(56) References Cited

U.S. PATENT DOCUMENTS

| 3,520,138 A | * | 7/1970 | Fox ........................... 60/226.1 |
| 3,540,682 A | * | 11/1970 | Howard et al. ............. 244/53 R |
| 3,907,386 A | * | 9/1975 | Kasmarik et al. ............. 384/559 |
| 4,790,133 A | * | 12/1988 | Stuart ........................ 60/226.1 |

* cited by examiner

*Primary Examiner* — Ninh H Nguyen
(74) *Attorney, Agent, or Firm* — Timothy J. Klima; Shuttleworth & Ingersoll, PLC

(57) ABSTRACT

In the area of the support struts and/or the aerodynamic fairings downstream of the stator vanes, the cross-section of the bypass duct of a turbofan engine is enlarged such that the pressure variations caused by the stagnation effect of the installations and reacting on the fan are reduced, enabling the fan to be operated with more efficiency and stability and finally the losses of the overall system and the fuel consumption to be reduced. The cross-sectional enlargement is accomplished by modifying the course of the wall in a limited area, actually by gradually enlarging the flow cross-section in the bypass duct in the axial and in the circumferential direction, with this enlargement being confined to the area around the leading edge of the support struts and/or the aerodynamic fairings.

15 Claims, 3 Drawing Sheets

BYPASS DUCT OF A TURBOFAN ENGINE

Figure 1:
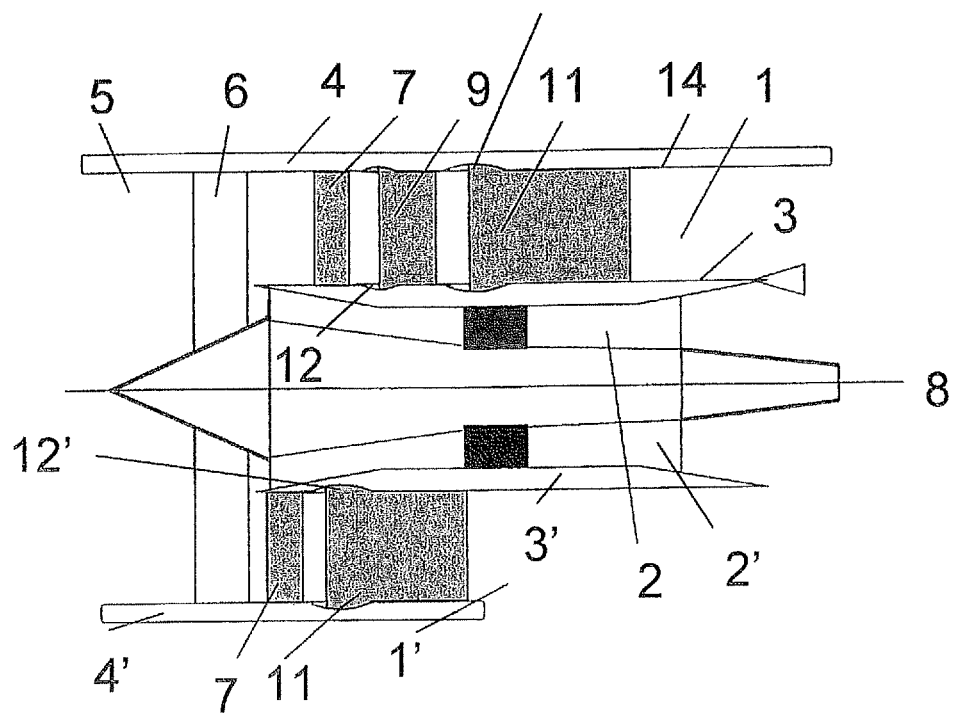

This application claims priority to German Patent Application DE102009011924.8 filed Mar. 10, 2009, the entirety of which is incorporated by reference herein.

This invention relates to the design of the bypass duct of a turbofan engine with support struts and aerodynamic fairings arranged between the duct inner wall and the duct outer wall.

Downstream of the fan of turbofan engines, which is arranged on the air intake side, the airflow is divided into an inner airflow, or core airflow, which is supplied via compressors to the combustion chamber and the turbine, and an outer airflow, or bypass airflow. The bypass airflow flows into a bypass duct which is confined by an inner sidewall and, externally, by the engine fairing supported thereon. Mutual support between the bypass duct and the core flow duct is provided by stator vanes arranged downstream of the fan and, depending on the type of the engine, by additional support struts arranged downstream of the stator vanes. Furthermore, at least one aerodynamic fairing accommodating lines for servicing the engine and/or aircraft is provided downstream of the stator vanes or downstream of the support struts, respectively, or also at the level of the support struts. The aerodynamic fairing serves as an aerodynamic fairing surrounding the servicing lines to minimize vibration-due mechanical effects as well as swirling and pressure losses in the bypass duct.

The support struts circumferentially arranged between the inner sidewall and the engine fairing and, in particular, the large-volume aerodynamic fairings cause stagnation of air and large static pressure variations in the circumferential direction of the bypass duct which react on the fan and impair its operational stability. The accordingly required increased stability of the fan design leads to an increase in fuel demand and, consequently, a reduction of the efficiency of the engine. To overcome these shortcomings, measures have already been proposed regarding variations in the design of the stator vanes and/or support struts or the aerodynamics of the fairing provided for the servicing lines, which, however, incur considerable investment.

A broad aspect of this invention is to provide a turbofan engine with installations arranged in the bypass duct such that a stable and efficient operation of the fan is ensured and losses and fuel consumption are minimized.

The present invention, in its essence, provides for an enlargement of the cross-section of the bypass duct of a turbofan engine in the area of the support struts and/or aerodynamic fairings arranged downstream of the stator vanes, thereby reducing the pressure variations caused by the stagnation effect of the installations and reacting upon the fan, enabling the fan to be operated with higher efficiency and more stability and, finally, decreasing the losses of the overall system as well as the consumption of fuel. The cross-sectional increase is effected in that the course of the wall is modified in a limited area by way of an axially and circumferentially gradual enlargement of the flow cross-section in the bypass duct which is confined to the area around the leading edge of the support struts and/or the aerodynamic fairings.

The enlargement may be provided on the duct inner wall and/or the duct outer wall and is variable according to the dimensioning of the aerodynamic fairings and support struts as well as the arrangement and mutual allocation in the bypass duct.

In a further embodiment of the present invention, the enlargement is established by a specific, axial and circumferential, sinusoidal form of the duct inner wall and/or the duct outer wall.

According to another feature of the present invention, the maximum height of the enlargement of the duct inner wall and/or the duct outer wall is situated at the level of the leading edge of the aerodynamic fairing(s) and/or the support struts.

In development of the present invention, the enlargement associated with the aerodynamic fairings extends upstream and downstream of their leading edge in the axial direction over a length corresponding to not more than twice the distance between the trailing edge of the support struts or the stator vanes, respectively, and the leading edge of the aerodynamic fairing or the support struts, respectively.

In further development of the present invention, the duct inner wall and/or the duct outer wall feature a cosinusoidal form extending over the entire circumference in the leading edge area of the support struts and/or the aerodynamic fairings, with the leading edges of the support struts and/or the aerodynamic fairings being each at the highest point in a wave trough defining the enlargement.

The maximum dimension of the height of the enlargement shall not exceed 50% of the total height of the aerodynamic fairing or the support struts and preferably be less than 20%.

Figure 4:
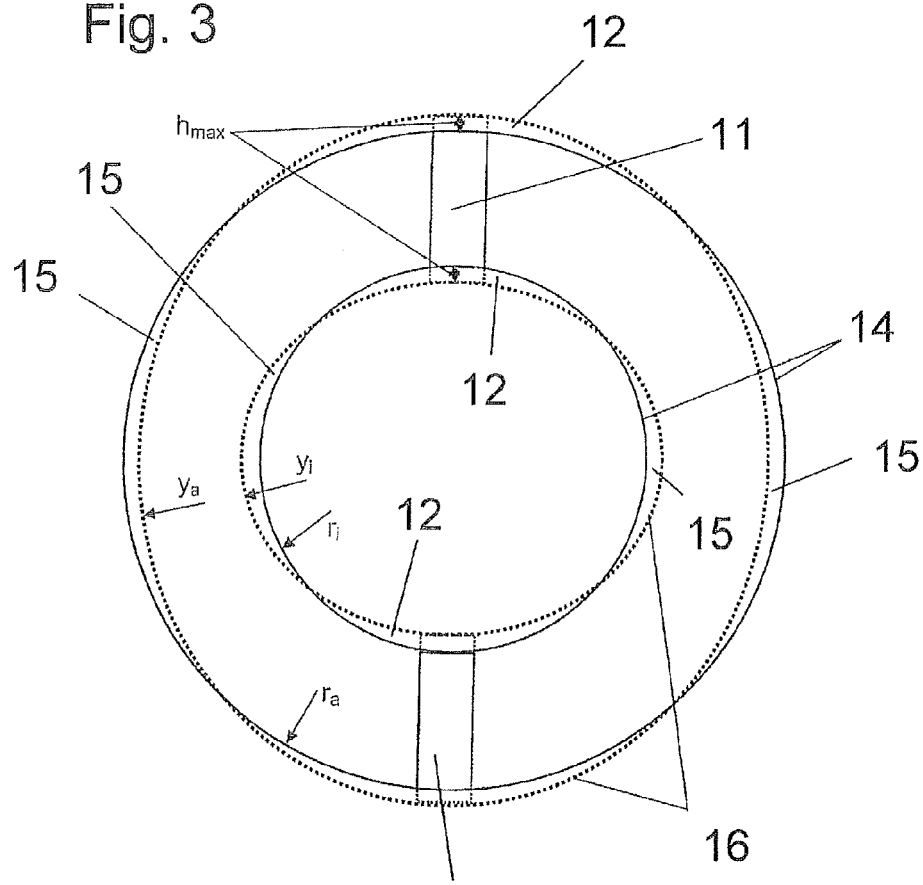
Figure 5:
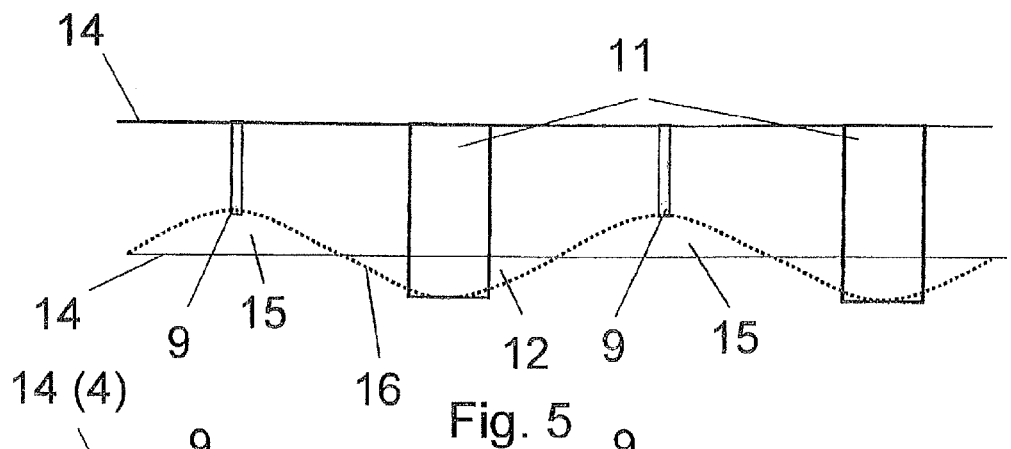
Figure 6:
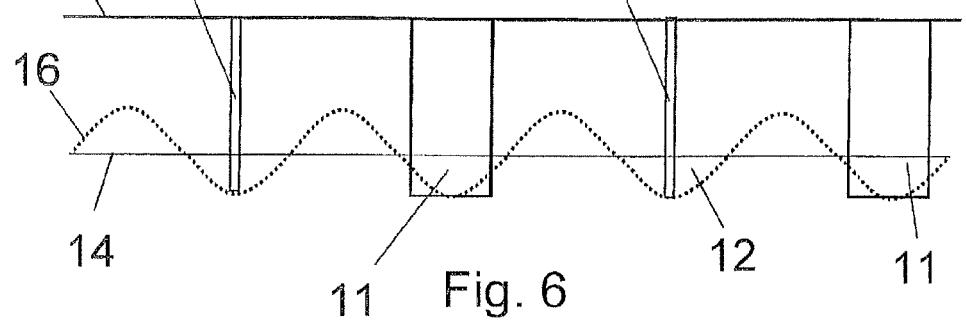
Figure 7:
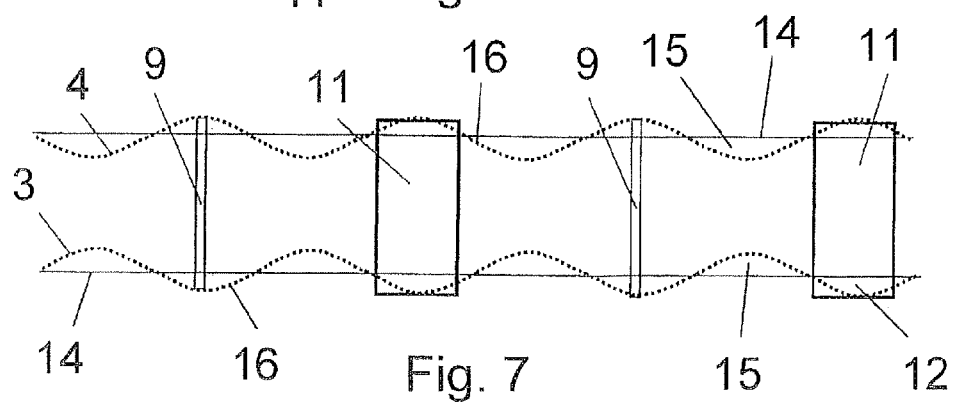
Figure 8:
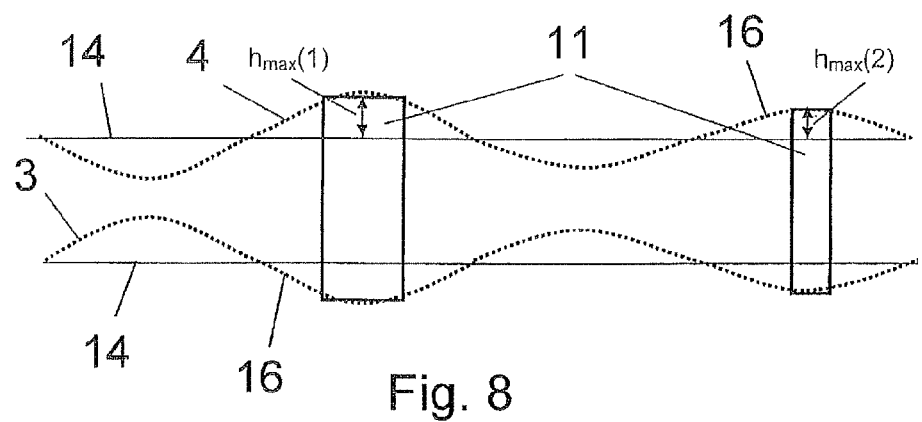

The present invention is more fully described in light of the accompanying drawing showing a preferred embodiment. In the drawing, FIG. 1 is a highly schematized representation of a turbofan engine with two different variants (shown above and below a machine axis, respectively) for the design of the bypass duct, FIG. 2 is a developed sectional view of the bypass duct shown in the top portion of FIG. 1, FIG. 3 is a graphical representation of the dimensioning of a depression provided in the bypass duct at an aerodynamic fairing in the axial direction, FIG. 4 is a representation of the contour of the duct inner and outer wall with two aerodynamic fairings arranged opposite to each other in the bypass duct, actually at the level of the leading edge of the aerodynamic fairing, FIGS. 5 to 7 are developments of different wall contours in the circumferential direction of the bypass duct with support struts being arranged between two aerodynamic fairings each, and FIG. 8 is a development of the duct contour in the circumferential direction with differently dimensioned aerodynamic fairings.

FIG. 1 shows, in highly simplified representation, a turbofan engine with two different designs of bypass ducts 1 (upper portion of view) and 1' (lower portion of view) confined by a duct inner wall 3, 3' enclosing the core flow duct 2, 2' and by the engine fairing, i.e. a duct outer wall 4, 4'. Arranged on the air intake side 5 is a fan 6 which is surrounded by the duct outer wall 4, 4' (engine fairing). The airflow produced by the fan 6 is divided and routed into the bypass duct and the core flow duct. Arranged in the bypass duct 1, 1' are circumferentially evenly distributed stator vanes 7 which eliminate the swirl in the flow produced by the fan 6 and also perform a supporting function between the duct outer wall 4, 4' and the duct inner wall 3, 3'. The bypass duct 1 shown above the engine axis 8 in FIG. 1 is, downstream of the stator vanes 7, provided with circumferentially evenly distributed support struts 9 enabling mutual support between the duct inner wall 3 and the duct outer wall 4. The bypass duct 1' shown beneath the axis 8 has no support struts. Arranged at a certain distance from the trailing edge 10 of the support struts 9 (FIG. 1, top) or the stator vanes 7, respectively, is aerodynamic fairing 11 which is used as a fairing for the servicing lines (not shown), but can also perform a supporting function between the duct outer wall 4, 4' and the duct inner wall 3, 3'.

Figure 2:
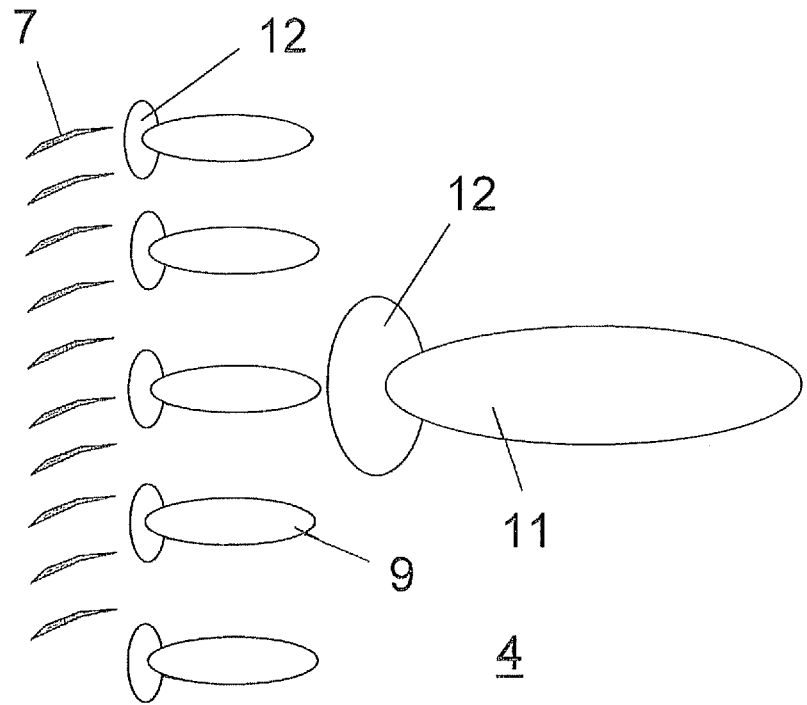

Referring to FIG. 2, the developed representation of a sectional view of the upper bypass duct 1 as per FIG. 1 shows, at the inner side of the duct outer wall 4 in an area extending between the trailing edge 10 of a support strut 9 and an area extending beyond the leading edge 13 of the aerodynamic fairing 11, a flat enlargement 12 gradually running out towards the side edges which is produced by a modified wall form. As shown in FIG. 1, such a depression of the wall or enlargement 12 of the flow cross-section, respectively, is also provided on the opposite side on the duct inner wall 3, with an enlargement 12' being likewise provided on the duct outer wall 4' and the duct inner wall 3' of the bypass duct 1'. It is also possible to provide the enlargement 12, 12' only on the duct inner wall 3, 3' or the duct outer wall 4, 4'. Moreover, the enlargements oppositely arranged on the duct inner wall and the duct outer wall can be provided with different shape, depth and size. Such a gradual enlargement 12, 12', which equally is a depression or indentation of the duct inner or outer wall limited to a certain area, is here also provided in the area of the leading edge of the support struts 9.

Figure 3:
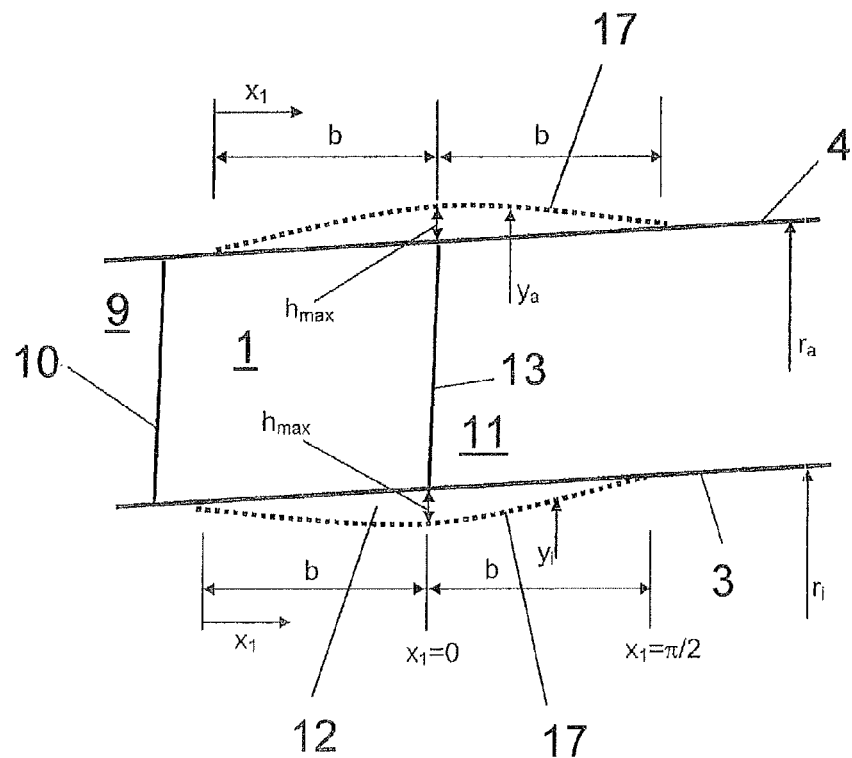

FIG. 3 is a graphical representation of the dimensioning of an enlargement 12 provided by the modified duct inner wall 3, 3' and the modified duct outer wall 4, 4' in the axial direction at the level of the forward part of the aerodynamic fairing 11. The length of the depression or enlargement 12, respectively, may ideally amount to not more than twice the distance D between the trailing edge 10 of a support strut 9 and the leading edge 13 of aerodynamic fairing 11. Depending on the respective arrangement or dimensioning of further aerodynamic fairings 11 arranged in the circumferential direction of the bypass duct, the longitudinal extension of the enlargement, as shown in FIG. 3, can also be less by a value 2 s, i.e., it can be 2 (D−s)=2b. The maximum height $h_{max}$ of the enlargement 12 formed by the bypass flow duct walls is in the area of the leading edge 13 of the aerodynamic fairing 11 and, in the example shown, is 20% of the height H of the aerodynamic fairing 11. The height $h_{max}$ at the leading edge of the aerodynamic fairing 11 should not exceed 50% of the height H, but practically be equal to or less than 20% of H. The course $y_i$, $y_a$ of the duct inner wall 3, 3' or the duct outer wall 4, 4', respectively, can be determined in both an axial direction ($y_{i-ax}$, $y_{a-ax}$) and a circumferential direction ($y_{i-um}$, $y_{a-um}$) of the engine. The course $y_{i-ax}$, $y_{a-ax}$ of the duct inner wall 3, 3' or the duct outer wall 4, 4', respectively, in the axial direction in the area of the enlargement 12 (dotted line 16) of the bypass duct 1, 1' is obtained via the running length $x_1$ from $y_{i-ax}=r_{ix1}+h_{x1}$ and $y_{a-ax}=r_{ax1}+h_{x1}$, with $r_i$ and $r_a$ being the inner radius and the outer radius, respectively, of the bypass duct, $x_1$ being the running variable in the axial direction and $h_{x1}=h_{max}*\cos_{x1}$. Variable $x_1$ can be either negative at the inner wall or positive at the outer wall since $h_{max}$ is chosen as a negative value at the inner wall and a positive value at the outer wall. Also, in the embodiment shown in FIG. 3, $x_1$ is zero at $h_{max}$ and equals $+\pi/2$ at $+b$ (to the right, or downstream, as seen in FIG. 3) and equals $-\pi/2$ at $-b$ (to the left, or upstream, as seen in FIG. 3).

FIG. 4 shows a sectional view of a bypass duct 1, 1' provided with two aerodynamic fairings 11, with the section passing at the level of the leading edge 13 of the aerodynamic fairings 11. The duct inner wall 3, 3' and the duct outer wall 4, 4' with the enlargements 12 provided in the area of the aerodynamic fairings 11 are shown as dotted lines with the radii $y_{i-um}$ and $y_{a-um}$, while the solid lines 14 indicate the original inner contour of the bypass duct 1, 1' with the radii $r_i$ and $r_a$.

The course of $y_{i-um}$ and $y_{a-um}$ along the circumference is established from $y_{i-um}=r_i+h_{z1}$ or $y_{a-um}=r_a+h_{z1}$, respectively, with $h_{z1}=h_{max}*\cos_{z1}$ and $z_1$ being the running variable in the circumferential direction. As shown in FIG. 4, the circumferentially gradually running out enlargements 12 with the maximum height $h_{max}$ at the leading edge of the aerodynamic fairing are facing a gradual enlargement 15 of the duct inner wall 3 and the duct outer wall 4 which has a maximum height $h_{max}$ and extends centrally between the aerodynamic fairings 11, so that in the circumferential direction, the modified wave-like course 16 (shown in dotted line) of the duct inner wall 3, 3' and the duct outer wall 4, 4' is obtained. As with variable $x_1$, variable $z_1$ can be either negative at the inner wall or positive at the outer wall since $h_{max}$ is chosen as a negative value at the inner wall and a positive value at the outer wall. Variable $z_1$ is not dependent upon the circumference itself, and can be independent from the 0 to $2\pi$ definition of the circle. Rather, variable $z_1$ can be arbitrarily chosen to get the desired cosine shape around the circumference. For example, to get the shape shown in FIG. 4, $z_1$ runs from 0 to $4\pi$. For any other shape as shown in FIGS. 5 to 8, a different $z_1$ is chosen with a running range from 0 to $X*\pi$.

FIGS. 5 to 7 show developments of the course of the wall contour of the duct inner and outer walls in a bypass duct 1, 1' in which support struts 9 are arranged between the aerodynamic fairings 11. According to FIGS. 5 and 6, the duct outer wall 4, 4' has the original, non-modified contour, with, according to FIG. 5, an enlargement 12 being provided at the aerodynamic fairings and the support struts 9 being arranged between an enlargement 15 of the duct inner wall 3, 3' and the non-modified duct outer wall 4, 4'. In contrast, in the variant according to FIG. 6, an enlargement 12 is provided on both the support struts and the aerodynamic fairings 11. In the configuration according to FIG. 7, the duct inner wall 3 and the duct outer wall 4 have a circumferentially wave-like contour, and the support struts 9 and the aerodynamic fairings 11 are associated with an enlargement 12 on both sides.

FIG. 8 shows yet another design variant of the duct contour in the circumferential direction, actually with differently dimensioned aerodynamic fairings 11. According to this, the height $h_{max(2)}$ of the depression 12 is smaller with a smaller aerodynamic fairing, and with correspondingly lesser displacement effect, than the height $h_{max(1)}$ with a larger aerodynamic fairing. Likewise, the height $h_{max}$ is adaptable to the respective size of the support struts 9 and the distance between the aerodynamic fairings 11 or the support struts 9.

LIST OF REFERENCE NUMERALS 1, 1' Bypass duct
2, 2' Core flow duct
3, 3' Duct inner wall
4, 4' Duct outer wall
5 Air intake side
6 Fan (blower)
7 Stator vanes
8 Engine axis
9 Support struts
10 Trailing edge of support strut 9
11 Aerodynamic fairing
12 Limited enlargement of flow duct cross-section, modified course of the wall, at duct inner/outer wall
13 Leading edge of aerodynamic fairing
14 Normal inner contour of bypass duct 1, 1'
15 Limited reduction of flow duct cross-section at duct inner/outer wall
$h_{max}$ Maximum height of enlargement H Height of aerodynamic fairing 11
D Distance between the trailing edge 10 of a support strut 9 and the leading edge 13 of aerodynamic fairing 11
$2b$ Length of enlargement in the axial direction
$r_i, r_a$ Inner/outer radius of 1, 1'
$y_{i-um}$-$y_{a-um}$ Course of limited enlargement of flow duct cross-section 12 in the circumferential direction
$y_{i-ax}$-$y_{a-ax}$ Axial course of limited enlargement of flow duct cross-section 12
$z_1$ Running variable in the circumferential direction
$x_1$ Running variable in the axial direction

What is claimed is:

1. A bypass duct of a turbofan engine, comprising:
a duct inner wall;
a duct outer wall;
a plurality of stator vanes arranged between the duct inner wall and the duct outer wall;
at least one of a support strut and an aerodynamic fairing;
an enlargement of a flow cross-section in the bypass duct gradually extending in both axial and circumferential directions and being limited to an area of a leading edge of the at least one of the support strut and the aerodynamic fairing to reduce pressure variations caused by a stagnation effect of the at least one of the support strut and the aerodynamic fairing.

2. The bypass duct of claim 1, wherein the enlargement is provided on at least one of the duct inner wall and the duct outer wall.

3. The bypass duct of claim 1, wherein the enlargement is provided on both of the duct inner wall and the duct outer wall.

4. The bypass duct of claim 1, wherein the enlargement is defined by a cosinusoidal form on at least one of the duct inner wall and the duct outer wall in the axial direction ($y_{i-ax}, y_{a-ax}$) and in the circumferential direction ($y_{i-um}, y_{a-um}$).

5. The bypass duct of claim 4, wherein a maximum height ($h_{max}$) of the enlargement of the at least one of the duct inner wall and/the duct outer wall is at the leading edge of the at least one of the support strut and the aerodynamic fairing.

6. The bypass duct of claim 5, wherein the enlargement associated with the at least one aerodynamic fairing, on an upstream and a downstream side of the leading edge of the aerodynamic fairing, axially extends over a length which amounts to not more than twice a distance (d) between a trailing edge of the at least one support strut and the leading edge of the at least one aerodynamic fairing positioned downstream of the at least one support strut.

7. The bypass duct of claim 5, wherein at least one of the duct inner wall and the duct outer wall have a cosinusoidal form extending over an entire circumference of the duct in the leading edge area of the at least one of the support strut and the aerodynamic fairing, with each leading edge of the at least one of the support strut and the aerodynamic fairing being positioned at a highest point ($h_{max}$) in a wave trough defining the enlargement.

8. The bypass duct of claim 7, wherein a maximum dimension of the height ($h_{max}$) of the enlargement does not exceed 50% of a total height (H) of the at least one of the support strut and the aerodynamic fairing.

9. The bypass duct of claim 8, wherein the maximum dimension of the height ($h_{max}$) of the enlargement does not exceed 20% of a total height (H) of the at least one of the support strut and the aerodynamic fairing.

10. The bypass duct of claim 8, wherein the maximum dimension of the height ($h_{max}$) of the enlargement does not exceed 20% of a total height (H) of the at least one of the support strut and the aerodynamic fairing.

11. The bypass duct of claim 5, wherein a maximum dimension of the height ($h_{max}$) of the enlargement does not exceed 50% of a total height (H) of the at least one of the support strut and the aerodynamic fairing.

12. The bypass duct of claim 11, wherein the maximum dimension of the height ($h_{max}$) of the enlargement does not exceed 20% of a total height (H) of the at least one of the support strut and the aerodynamic fairing.

13. The bypass duct of claim 4, wherein the enlargement associated with the at least one aerodynamic fairing, on an upstream and a downstream side of the leading edge of the aerodynamic fairing, axially extends over a length which amounts to not more than twice a distance (d) between a trailing edge of the at least one support strut and the leading edge of the at least one aerodynamic fairing positioned downstream of the at least one support strut.

14. The bypass duct of claim 4, wherein at least one of the duct inner wall and the duct outer wall have a cosinusoidal form extending over an entire circumference of the duct in the leading edge area of the at least one of the support strut and the aerodynamic fairing, with each leading edge of the at least one of the support strut and the aerodynamic fairing being positioned at a highest point ($h_{max}$) in a wave trough defining the enlargement.

15. The bypass duct of claim 14, wherein a maximum dimension of the height ($h_{max}$) of the enlargement does not exceed 50% of a total height (H) of the at least one of the support strut and the aerodynamic fairing.

\* \* \* \* \*